June 10, 1947.  W. C. KLINE  2,422,102
COFFEE ROASTING APPARATUS
Filed March 19, 1943   3 Sheets-Sheet 1

Inventor
William C. Kline
by Edward W. Weikert
Atty.

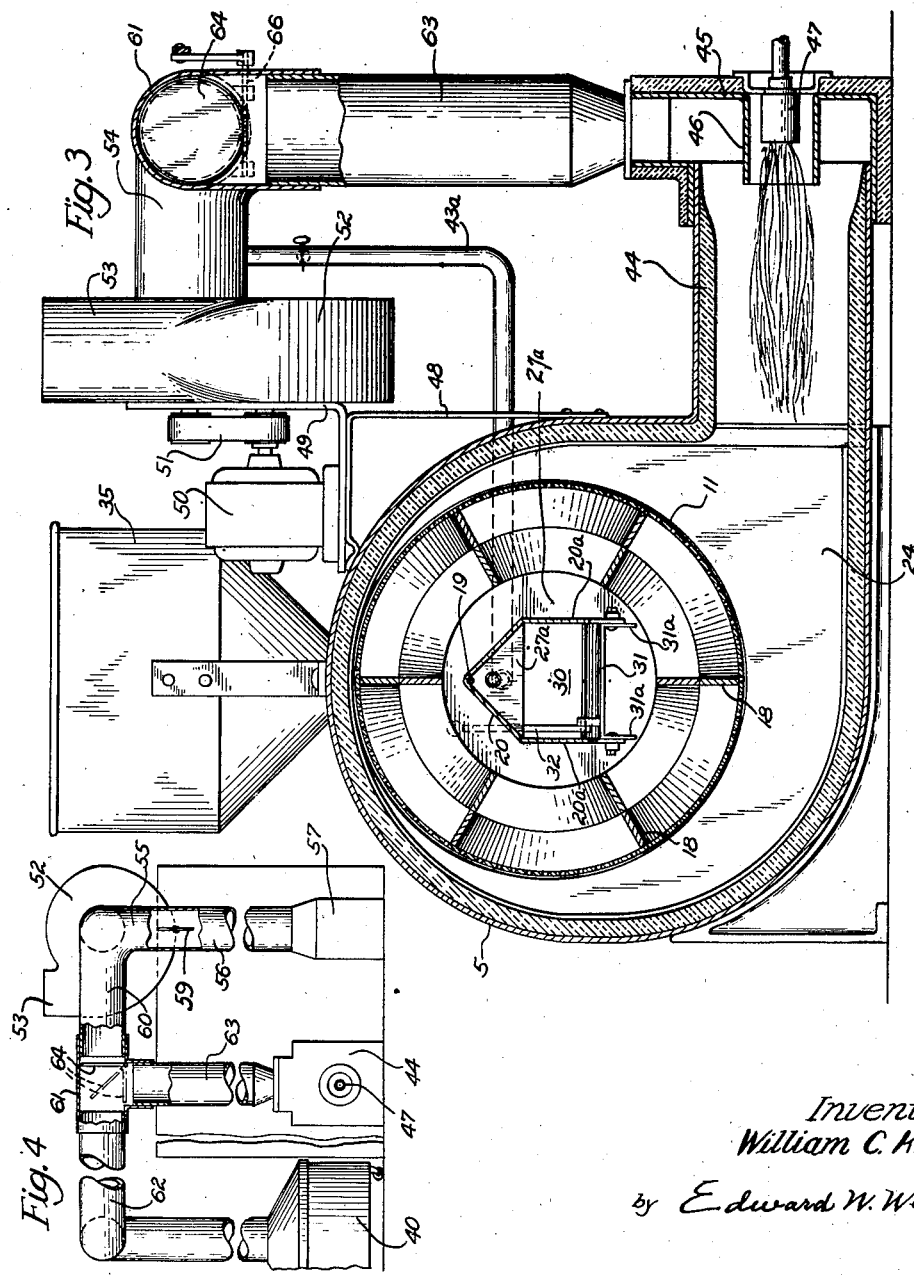

Patented June 10, 1947

2,422,102

UNITED STATES PATENT OFFICE 2,422,102

COFFEE ROASTING APPARATUS

William C. Kline, Oak Lawn, Ill.

Application March 19, 1943, Serial No. 479,820

12 Claims. (Cl. 263—32)

This invention relates to a coffee roasting apparatus and concerns itself with a structure in which the heat from the cooling pan is drawn into the roasting chamber, in which a preheating chamber is provided in the roasting apparatus through which the exhaust heat from the roasting chamber is passed and in which the heat is drawn in circumferentially of the roasting chamber. This application is in part a continuation of my application, Ser. No. 349,011, filed July 31, 1940, now abandoned.

One of the main objects of this invention is to reduce the roasting period of coffee in the roasting chamber. To this end, the heat and products of combustion exhausted from the roasting chamber are drawn through a pre-heating or auxiliary chamber containing green coffee which is passed into the roasting chamber whenever the same is emptied of a roasted batch. Thus the coffee entering the roasting chamber is already in an initial or partly roasted state.

Other objects and advantages will be pointed out and become apparent as the description proceeds.

The invention comprises the novel structure and combination of parts hereinafter described and more particularly pointed out and defined in the appended claims.

In the accompanying drawing which illustrates a preferred form of this invention and in which similar reference numerals refer to similar features in the different views:

Fig. 3 is a part sectional and part elevational view taken upon the line 3—3 of Fig. 1; and Fig. 4 is a fragmentary and reduced sectional view with parts in elevation taken substantially upon the line 4—4 of Fig. 1.

Figure 1:
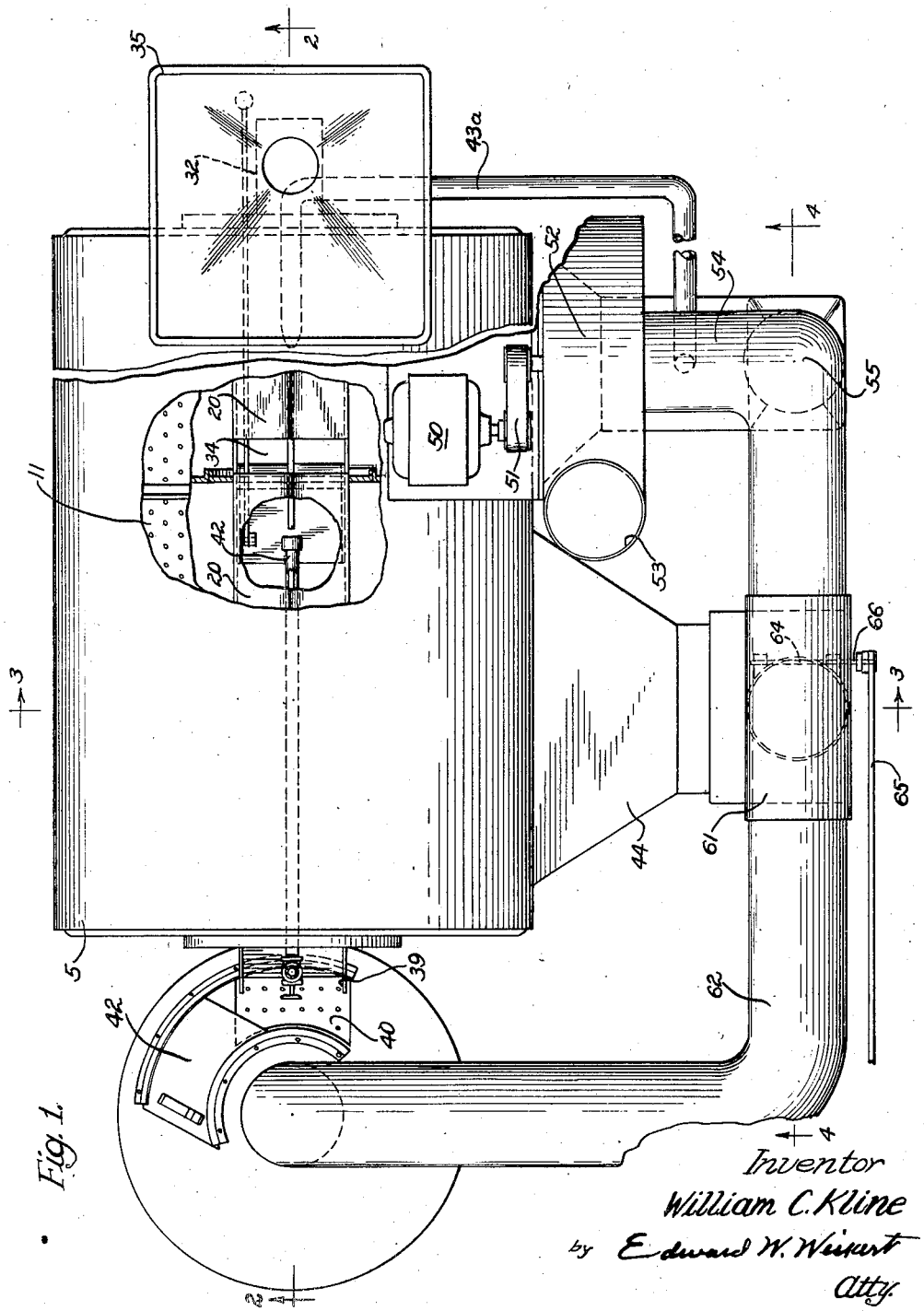
Fig. 1 is a top plan view with parts broken away of my novel roasting apparatus.

In referring now to the drawing, there is shown a substantially cylindrical casing 5 provided with end closures, each consisting of a plate 6 having a large eccentric aperture 7; in the aperture 7 of the rear plate 6, there is a bearing 8 while in the aperture 7 of the forward plate 6, there is a bearing 9. The bearings 8 and 9 are provided upon their interior sides with bearing grooves or raceways 10.

Mounted eccentrically within the casing 5 is a perforated drum 11 having circular end plates 12 provided with outwardly extending bearing flanges 13 which extend into and rotate in the raceways 10. It will be noted that these circular end plates 12 are in the form of flat rings and that the bearing flanges are formed at their inner edges leaving large openings therein. Upon the front plate 12, there is secured a gear ring 14 with which a pinion 15 is in mesh. The pinion 15 is secured upon the shaft 16 of a driving motor 17 whereby the drum is rotated. Within the rotatable drum are suitable curved agitating ribs 18 for agitating the coffee during the roasting operation.

Extending longitudinally through the roasting drum 11, there is a rod 19 which is supported in the end bearings and which forms a support for a coffee spreader 20. The upper portion of the coffee spreader or distributer 20 is triangular (Fig. 3) with the rod 19 seated in the upper apex. The triangular portion terminates at its lower end in parallel wings 20a as shown in Fig. 3. The housing 5 and the rotary roasting chamber 11 are each divided into two compartments. It will be noted that the housing 5 is provided with insulation 21 around the interior surface thereof. At the forward end of the insulation 21, there is an angle member 22 having one flange 23 directed inwardly. A plate 24 in the form of a ring is attached to the flange 23 and extends closely adjacent the perforated wall of the roasting chamber or cylinder 11 where it abuts against the outstanding flange 25 of a circular angle member 26 extending around the roasting cylinder and forming a bearing therefor with respect to the plate 24. The plate 24 divides the space outside the roasting cylinder into two compartments.

The roasting cylinder is also divided into two compartments by means of plates or rings 27 and 27a. The plate 27 is attached at its outer edge to an angle member 28 extending around and attached to the interior surface of the roasting cylinder. This plate is provided with a circular bearing flange 27b at its inner edge which rotates around the circular edge of the plate 27a which is stationary and fits around the shield 20 which provides a suction passage thereunder through the partition. The plate 27a has an opening 30 thru which a swinging door or chute 31 is adapted to swing. The rear chamber is the roasting chamber while the forward chamber to the right of the door 31 is the pre-heating chamber for receiving the green coffee and preheating the same.

Figure 2:
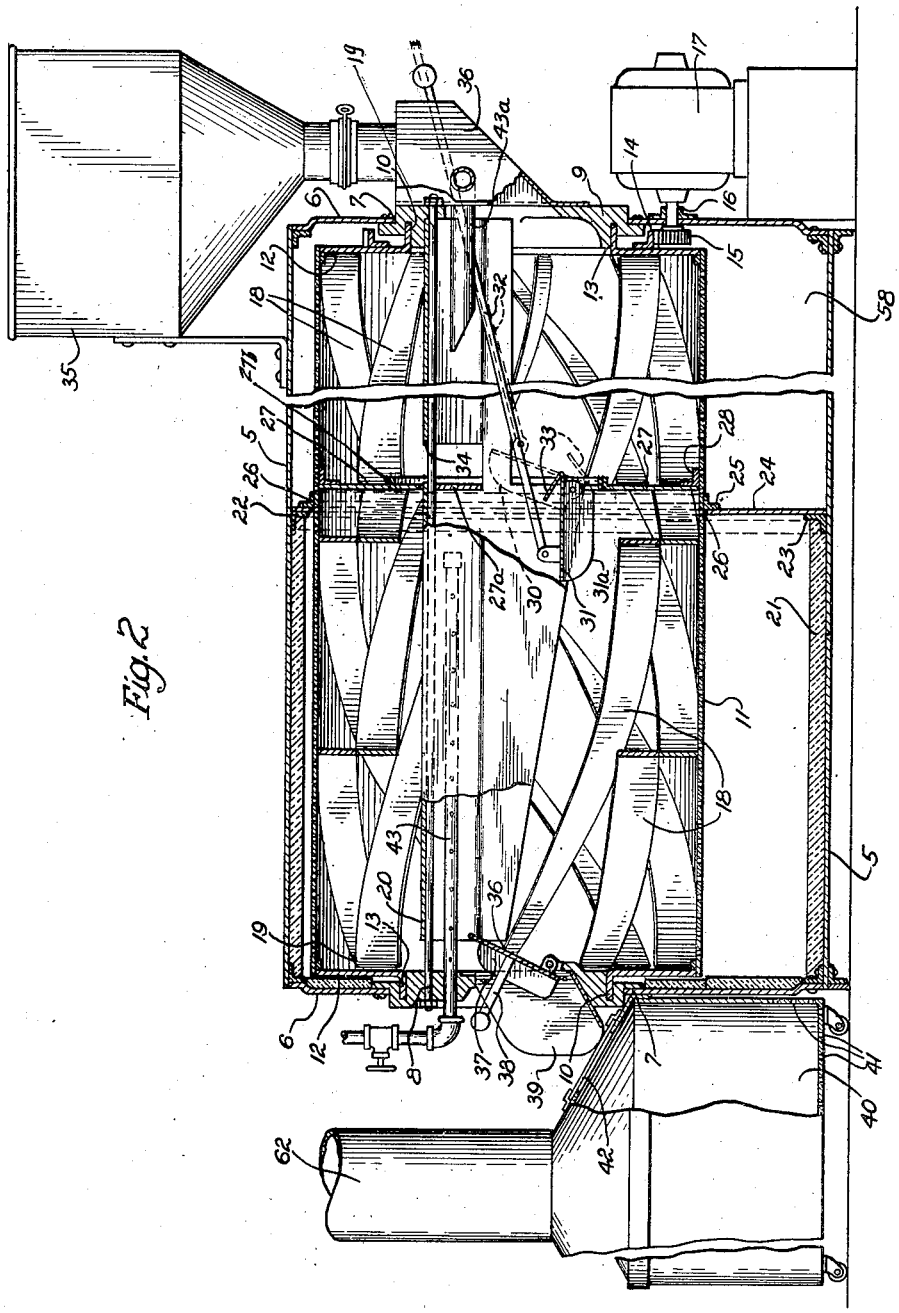
Fig. 2 is a vertical sectional view taken upon the line 2—2 of Fig. 1 with parts omitted.

The chute 31 has side wings 31a which are pivoted to the parallel walls 20a of the spreader 20 between which the chute extends (Fig. 3). A handle 32 is pivoted to the chute 31 and extends through an opening in the front bearing 9 so that it may be grasped by an attendant. The chute 31 is provided with a tail plate 33 that slopes upwardly when the chute is in horizontal position as shown in full lines in Fig. 2 and which serves to deflect any coffee beans to the right when they drop down in the pre-heating compartment. The spreader 20 is cut away to provide a gap or opening 34 directly adjacent the plate 27a through which the unroasted coffee beans can drop during the rotation of the cylinder. When the chute 31 is in full line position as shown in Fig. 2, the coffee beans dropping through the opening 34 will merely fall to the bottom of the cylinder 11 and any striking deflecting plate 33 will bounce back to the right. However, when the chute 31 is swung into upright position so as to slope toward the right, the coffee beans falling through the gap 34 will strike the channel side of the chute and be deflected into the roasting chamber. By this means, the roasting compartment is charged with pre-heated or initially roasted coffee.

At the forward end of the housing, there is a hopper 35 connected with a chute 36 secured to the front bearing 9 which has an opening through which the green coffee beans can be charged into the pre-heating chamber.

At the rear end of the housing there is a discharge door 36 hinged to the bearing 8 and adapted to open and close a roasted coffee discharge opening 37 therein. For this purpose, the door 36 is provided with a handle 38. From the opening 37 there extends a discharge chute 39 which is designed to discharge the coffee into a cooling pan or receptacle 40 having lower perforated walls 41 for the admission of air. The top or cover of the pan is imperforate and is provided with a sliding door 42 (Figs. 1 and 2) to admit the roasted coffee from the chute 39.

A spray pipe 43 extends into the roasting chamber through the stationary bearing 8 for supplying moisture or water after a roast in the event that such is desired. A chaff or dust exhaust pipe 43a extends through the front bearing 9 and into the pre-heating chamber. This pipe 43 is connected to an exhaust fan as will later appear.

The insulated housing 5 is provided or formed with a conduit 44 (Fig. 3) leading laterally from the lower portion thereof, and connecting with a fire chamber 45. Extending from the front wall of the fire box, there is a nozzle cylinder 46 into which a flame nozzle 47 is directed for supplying a flame within the roasting chamber. It will be noted that this flame or products of combustion will pass into the casing 5 and be drawn through the perforated wall of the roasting drum, as will later more fully appear.

An L-shaped bracket 48 (Fig. 3) extends from the housing 5 and a second L-shaped bracket 49 extends from the top arm of the bracket 48. These brackets are so arranged that each has a vertical arm and a horizontal arm with the horizontal arms overlapping and forming a base support for a fan motor 50 which is suitably geared as indicated at 51 to a fan generally denoted by the reference 52 mounted upon the vertical arm of the L-shaped bracket 49. The fan casing embodies an exhaust pipe 53 which exhausts into the atmosphere.

The fan casing on its suction side is connected with a pipe 54 to which the aforementioned chaff exhaust pipe 43 is connected.

The pipe 54 is connected with a hollow elbow 55 from which a pipe 56 (Fig. 4) extends down into communication with a suction conduit 57 that communicates with the space 58 (Fig. 2) surrounding the pre-heating chamber of the roasting cylinder. In other words, the conduit 57 may be said to communicate with the pre-heating chamber of the housing 5. A damper 59 may be placed in the pipe 56 for shutting the passage to the pre-heating chamber when desired.

A horizontal pipe 60 extends from the elbow 55 and connects with the head of a T connection 61. A pipe 62 extends from the opposite side of the T connection 61 to the top of the coffee cooling pan 40, and a pipe 63 extends downwardly from the shank of the T connection and communicates with the flame conduit 44. A damper 64 is located in the T head and is designed to normally close the pipe 60 that leads to the fan. This damper may be moved as shown in dotted lines in Fig. 4 to close pipe 63 and open pipe 60, for directly establishing communication between the fan and cooling chamber when it is not desired to utilize the heat from the coffee cooling pan. A rod 65 is secured to the pivot axle 66 of the damper 64 for controlling the same as shown in Fig. 1.

During the operation of the roasting apparatus the fan 52 which is in communication with the preheating chamber will draw the products of combustion and hot air through the perforated wall of the roasting chamber, then through the roasting chamber and the preheating chamber into the fan to be exhausted through the fan exhaust pipe 53. This suction of the fan will also draw the hot air from the cooling pan 40 through pipe 62 and pipe 63 into the flame conduit 44 and then into the roasting chamber whereby the hot air from the cooling pan is utilized in the roasting operation.

While a batch of coffee beans is being roasted in the roasting chamber, a second batch is being preheated or partially roasted in the preheating chamber. It will, of course, be understood that these batches of coffee are in their respective compartments or chambers in the perforated roasting drum. When a batch has been roasted in the roasting chamber, it is discharged through the door 36 into the cooling pan. Thereafter, the charging chute 31 is swung into the upstanding dotted line position so that the preheated coffee can be charged into the roasting chamber. It will further be understood that the roasting drum or cylinder will be rotating during these operations.

From the foregoing, it will be evident that the utilization of the heat from the cooling pan will expedite the roasting operation. Further, as the coffee beans are preheated or partially roasted when they enter the roasting chamber of the drum, the roasting period is considerably reduced and in the utilization of the exhaust from the roasting chamber for preheating a batch of coffee beans, a notable economy is effected.

It will further be evident that my novel apparatus involves a new method of roasting coffee in which the products of combustion are drawn radially into the roasting chamber, then longitudinally and centrally through the roasting chamber and centrally into the preheating chamber, then radially through the preheating chamber, whereby the exhaust from the roasting chamber is utilized for preheating green coffee before it is passed into the roasting chamber, and while a batch is being roasted in the roasting chamber. At the same time, the hot air from the cooling pan is utilized to increase the heating effect, Thus while one batch of coffee is being roasted, another batch is being preheated by the products of combustion exhausted from the roasting batch through a novel flow of the products of combustion.

I am aware that many changes may be made and various details of construction may be modified without departing from the principles of this invention, so I do not propose limiting the patent granted thereon otherwise than necessitated by the prior art and appended claims.

I claim as my invention:

1. In a coffee roasting apparatus, a casing, a rotary perforated drum eccentrically mounted in said casing, means for rotating said drum, means between said casing and drum for dividing said casing into a coffee roasting compartment and a coffee preheating compartment, means in said drum for dividing the same into a roasting chamber and a preheating chamber, the dividing means in said drum having a suction passage therethrough, means for feeding coffee into said preheating chamber, means for passing coffee from the preheating chamber to the roasting chamber, means for discharging coffee from the roasting chamber, means for supplying heat to said roasting chamber and suction means for drawing said heat radially into and longitudinally of said roasting chamber and then into said preheating chamber and radially out of the preheating chamber.

2. In a coffee roasting apparatus, a casing, means dividing said casing into a coffee roasting compartment and a coffee preheating compartment, a perforated drum eccentrically mounted in said casing, means for rotating said drum, means dividing said drum into a coffee roasting chamber located in said roasting compartment and a coffee preheating chamber located in said preheating compartment, said drum dividing means having a suction passage therethrough, means for feeding coffee from said preheating chamber to said roasting chamber, means for supplying products of combustion to said roasting chamber, and suction means for drawing said products into and thru said roasting chamber and into and thru said preheating chamber and means for feeding coffee beans to said preheating chamber.

3. In a coffee roasting apparatus, a casing, means dividing said casing into a coffee roasting compartment and a coffee preheating compartment, a cooling pan having a conduit leading to said roasting compartment, a rotary drum mounted in said casing, means dividing said drum into a coffee roasting chamber located in said roasting compartment and a coffee preheating chamber located in said preheating compartment, said drum dividing means having a suction passage therethrough, means for rotating said drum, means for passing coffee from said preheating chamber to said roasting chamber, means for feeding coffee to said preheating chamber, means for discharging coffee from said roasting chamber to said pan, means for supplying products of combustion to said roasting compartment and exhaust means for drawing said products into and thru said roasting chamber and into said preheating chamber and simultaneously drawing the hot air from said cooling pan into said roasting compartment and thru said chambers.

4. In a coffee roasting apparatus, a housing, a roasting drum mounted in said housing, means for rotating said drum, means dividing said drum into a roasting chamber and a preheating chamber, said drum dividing means having a suction passage therethrough means for feeding coffee beans into said preheating chamber, a coffee cooling pan adjacent said housing, a conduit extending from said pan to said housing, means for discharging coffee from said roasting chamber to said pan, means for passing coffee from said preheating chamber to said roasting chamber, means for supplying products of combustion to said drum and suction means for drawing such products of combustion into said drum including the hot air from said pan and discharging the same radially from said preheating chamber.

5. In a coffee roasting apparatus, a housing, a coffee roasting drum eccentrically mounted in said housing, a partition in said drum dividing the same into a roasting chamber and a preheating chamber, said partition having a suction passage therethrough, a manually controlled gate in said partition for establishing communication between said chambers, means for rotating said drum, means for forcing products of combustion into said housing against said roasting chamber, means for feeding coffee beans to said preheating chamber and suction means for drawing said products into said roasting chamber and longitudinally thereof and into said preheating chamber and radially out of said preheating chamber for the purpose set forth.

6. In a coffee roasting apparatus, a casing having a coffee roasting compartment and a coffee preheating compartment, a rotary drum mounted in said casing and having a partition dividing the same into a coffee roasting chamber located in said roasting compartment and a preheating chamber located in said preheating compartment, said partition having a suction passage therethrough, means for rotating said drum, means for feeding coffee beans from said preheating chamber to said roasting chamber during the rotation of said drum, means for forcing products of combustion into said roasting compartment and suction means for drawing said products thru said roasting chamber in a longitudinal direction and into said preheating chamber and radially out of said preheating chamber.

7. In a coffee roasting apparatus, a casing, a rotary perforated drum mounted in said casing, means between said drum and casing for dividing said casing into a roasting compartment and a preheating compartment, means dividing said drum into a roasting chamber located in said roasting compartment and a preheating chamber located in said preheating compartment, said drum dividing means having a suction passage therethrough, means for rotating said drum, a cooling pan adjacent said casing, a conduit connecting said pan and casing at said roasting compartment, means for supplying products of combustion to said roasting compartment, means for feeding coffee beans to said preheating chamber, means for feeding coffee beans from said preheating chamber to said roasting chamber and suction means for drawing said products of combustion into and longitudinally thru said roasting chamber and into and thru said preheating chamber, said last mentioned means also drawing the heat from said cooling pan into said roasting chamber and means for discharging roasted coffee from said roasting chamber to said pan.

8. In an apparatus for roasting coffee, a housing, a perforated coffee roasting drum mounted in said housing, means between said housing and drum dividing said housing into a roasting compartment and a preheating compartment, means dividing said drum into a roasting chamber located in said roasting compartment and a preheating chamber located in said preheating compartment, said drum dividing means having a suction passage therethrough controllable means for feeding coffee beans from said preheating chamber to said roasting chamber, means for supplying products of combustion to said roasting compartment and suction means for drawing said products of combustion into said roasting chamber and then longitudinally into said preheating chamber.

9. In a coffee roasting apparatus, a casing, a rotary drum mounted in said casing, means for rotating said drum, means between said drum and casing dividing said casing into a coffee roasting compartment and a coffee preheating compartment, means for dividing said drum into a coffee roasting chamber located in said roasting compartment and a coffee preheating chamber located in said preheating compartment, said drum dividing means having a suction passage therethrough means for feeding coffee from said preheating chamber to said roasting chamber, means for forcing products of combustion into said roasting compartment, a coffee cooling pan adjacent said casing, a conduit connecting said pan with said roasting compartment and suction means connected with said preheating compartment for drawing the products of combustion into said roasting chamber and then longitudinally therethru and into said preheating chamber and simultaneously drawing the hot air from the cooling pan into the roasting chamber, said roasting chamber having means for feeding hot coffee to said roasting pan.

10. In a coffee roasting apparatus, a casing, a rotary perforated drum in said casing, means for rotating said drum, means between said drum and casing for dividing said casing into a coffee roasting compartment and a coffee preheating compartment, a partition comprising relatively rotatable parts dividing said drum into a coffee roasting chamber and a coffee preheating chamber, said partition having a suction passage therethrough, a manually operable gate in said partition for feeding coffee from said preheating chamber to said roasting chamber, a cooling pan adjacent said apparatus, a gate for discharging coffee from said roasting chamber to said cooling pan, a conduit leading from said pan to said casing and means for drawing production of combustion into said drum including hot air from said cooling pan and discharging the same radially through said preheating chamber.

11. In a coffee roasting apparatus, a casing, a perforated drum in said casing, means between said drum and casing dividing said casing into a coffee roasting compartment and a coffee preheating compartment, a partition dividing said drum into a coffee preheating chamber and a coffee roasting chamber, said partition comprising a central stationary part and a surrounding rotating part attached to said drum, a gate in said stationary part, and said partition having a suction passage and means for drawing production of combustion into said roasting chamber through said suction passage and into and through said preheating chamber.

12. In a coffee roasting apparatus, a casing, a rotary perforated drum in said casing, means between said drum and casing dividing the same into a coffee roasting compartment and a coffee preheating compartment, a partition in said drum dividing the same into a coffee roasting compartment and a coffee preheating compartment, said partition comprising a central circular portion and a surrounding rotational portion attached to said drum, a coffee spreader in said drum extending through the stationary portion of said partition and forming a suction passage, a gate in said stationary portion of the partition, and means for drawing production of combustion through said drum from the roasting chamber to and through said preheating chamber.

WILLIAM C. KLINE.

REFERENCES CITED

The following references are of record in the file of this patent:

UNITED STATES PATENTS

| Number | Name | Date |
|---|---|---|
| 1,911,763 | Meade | May 30, 1933 |
| 2,278,767 | Broply | Apr. 7, 1942 |
| 1,187,959 | Ash | June 20, 1916 |
| 1,102,662 | Hobbs | July 7, 1914 |
| 888,475 | Cummer | May 26, 1908 |
| 1,009,225 | Cummer | Nov. 21, 1911 |
| 1,086,843 | Nissinen | Feb. 10, 1914 |
| 1,742,978 | Weathersby | Jan. 7, 1930 |
| 900,032 | McCarter | Sept. 29, 1908 |

FOREIGN PATENTS

| Number | Country | Date |
|---|---|---|
| 224,111 | Great Britain | Nov. 6, 1924 |